(12) United States Patent
Sajdowitz

(10) Patent No.: US 9,065,307 B2
(45) Date of Patent: Jun. 23, 2015

(54) APPARATUS FOR FACILITATING ATTACHMENT OF FAN AND FLYWHEEL IN AN INTERNAL COMBUSTION ENGINE

(75) Inventor: Scott C. Sajdowitz, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 180 days.

(21) Appl. No.: 13/565,931

(22) Filed: Aug. 3, 2012

(65) Prior Publication Data
US 2014/0033996 A1    Feb. 6, 2014

(51) Int. Cl.
  F16B 17/00  (2006.01)
  H02K 9/06   (2006.01)
  F16D 1/076  (2006.01)
  F16F 15/315 (2006.01)

(52) U.S. Cl.
  CPC ............ H02K 9/06 (2013.01); *Y10T 403/7075* (2015.01); *Y10T 29/49959* (2015.01); F16D 1/076 (2013.01); F16F 15/315 (2013.01)

(58) Field of Classification Search
  CPC .......... F16D 1/076; F16D 1/10; F16F 15/315; F01P 7/04
  USPC ............. 123/41.65, 192.1; 72/572.2, 572.21; 403/376; 29/525.08
  See application file for complete search history.

(56) References Cited

U.S. PATENT DOCUMENTS

| | | |
|---|---|---|
| 1,501,054 A | 7/1924 | Karitzky |
| 2,299,010 A | 10/1942 | Doman |
| 2,384,918 A | 9/1945 | Houk |
| 2,569,826 A | 10/1951 | Packard |
| 2,932,447 A * | 4/1960 | Phelon ............................ 416/60 |
| 3,076,668 A | 2/1963 | Famely |
| 3,112,547 A | 12/1963 | Poe |
| 3,116,528 A | 1/1964 | Poe |
| 3,183,902 A * | 5/1965 | Wicklund .................. 123/41.65 |

(Continued)

FOREIGN PATENT DOCUMENTS

| CN | 200978704 | 11/2007 |
|---|---|---|
| CN | 201198890 Y | 2/2009 |

(Continued)

OTHER PUBLICATIONS

Rivets—Fastening Systems; www.fasteningsystems.com/rivets.html; printed on Jan. 25, 2012; 13 pages.

(Continued)

*Primary Examiner* — Stephen K Cronin
*Assistant Examiner* — Grant Moubry
(74) *Attorney, Agent, or Firm* — Whyte Hirschboeck Dudek S.C.

(57) ABSTRACT

An apparatus and method for facilitating coupling of a fan and a flywheel, as well as an internal combustion engine and other applications for such apparatus and method are described herein. In one example embodiment, an apparatus for facilitating coupling of a fan and a flywheel includes a plurality of protrusions formed on the fan, wherein each of the protrusions defines a respective hole therewithin, a plurality of receiving structures formed in the flywheel, and a plurality of pins. The receiving structures are positioned so that, when the fan is axially aligned with and adjacent to the flywheel, the protrusions are respectively received by the receiving structures. Further, when the pins are inserted into the holes, portions of the protrusions expand outwardly so that interference is created between surfaces of the protrusions and the receiving structures, whereby due to the interference the fan and flywheel are rotationally coupled.

19 Claims, 4 Drawing Sheets

(56) References Cited

U.S. PATENT DOCUMENTS

| | | |
|---|---|---|
| 3,235,297 A | 2/1966 | Fernberg |
| 3,596,554 A | 8/1971 | Low et al. |
| 3,603,626 A | 9/1971 | Whiteside |
| 3,952,712 A | 4/1976 | Hermanson |
| 4,046,488 A | 9/1977 | Wickham |
| 4,114,509 A | 9/1978 | Poe |
| 4,168,650 A | 9/1979 | Dahl et al. |
| 4,375,342 A | 3/1983 | Wollar et al. |
| 4,403,377 A | 9/1983 | Mizusawa |
| 4,407,619 A | 10/1983 | Siebol |
| 4,550,697 A | 11/1985 | Campen |
| 4,606,305 A | 8/1986 | Campen |
| 4,838,762 A | 6/1989 | Savage et al. |
| 4,961,687 A | 10/1990 | Bost et al. |
| 5,259,689 A | 11/1993 | Arand et al. |
| 5,356,252 A | 10/1994 | Whistler, III et al. |
| 5,514,038 A | 5/1996 | Harpin |
| 5,568,675 A | 10/1996 | Asami et al. |
| 5,850,676 A | 12/1998 | Takahashi et al. |
| 6,006,703 A | 12/1999 | Nakamura et al. |
| 6,089,805 A | 7/2000 | Salmon |
| 6,324,731 B1 | 12/2001 | Pliml, Jr. |
| 6,514,024 B2 | 2/2003 | Akeman et al. |
| D498,414 S | 11/2004 | Yoneoka |
| D500,245 S | 12/2004 | Okada |
| 7,082,661 B2 | 8/2006 | Ijames et al. |
| 7,150,207 B2 | 12/2006 | Jäckel et al. |
| 7,249,922 B2 | 7/2007 | Yoneoka |
| D566,534 S | 4/2008 | Okada |
| 7,934,481 B2 | 5/2011 | Zingelmann |
| 7,950,355 B2 * | 5/2011 | Nakamizo ................ 123/41.67 |
| 8,714,051 B2 * | 5/2014 | Dopke et al. ............... 74/572.21 |
| 2002/0026693 A1 | 3/2002 | Akema et al. |
| 2009/0120401 A1 | 5/2009 | Dopke et al. |
| 2009/0217507 A1 | 9/2009 | Frank et al. |
| 2010/0284760 A1 | 11/2010 | Rotolo et al. |

FOREIGN PATENT DOCUMENTS

| | | |
|---|---|---|
| DE | 4309521 A1 | 10/1993 |
| JP | 62278322 A | 12/1987 |
| JP | 11141517 A | 5/1999 |
| JP | 2000337326 A | 12/2000 |
| JP | 2010013937 | 1/2010 |

OTHER PUBLICATIONS

Notification of First Office Action for Chinese patent application No. 201310322854.7 dated Apr. 24, 2015, 10 pages.

* cited by examiner

APPARATUS FOR FACILITATING ATTACHMENT OF FAN AND FLYWHEEL IN AN INTERNAL COMBUSTION ENGINE

CROSS-REFERENCE TO RELATED APPLICATIONS

Field of the Invention

The present invention relates to internal combustion engines and, more particularly, to arrangements of fans and flywheels in internal combustion engines.

BACKGROUND OF THE INVENTION

Internal combustion engines, particularly air-cooled internal combustion engines, often include both a flywheel and a fan that are coaxially-aligned with, and rotated by, the crankshaft of the engine. In some such engines, the flywheel is attached to the crankshaft and the fan in turn is attached to the flywheel, such that rotation of the crankshaft ultimately causes rotation of both the flywheel and the fan.

Various techniques are currently employed to attach a fan to a flywheel in such engines. In some current arrangements, the fans are made of plastic and molded so as to include "lugs" or protrusions (also made of plastic) that fit into complementary holes on the flywheel. These lugs are intended to guarantee that the fan rotates along with the flywheel, that is, to maintain rotational retention between the fan and the flywheel. Although suitable for some applications, such arrangements involving lugs are limited in their usefulness because, due to the stress of operation, the lugs can break over time. This is particularly the case because the lugs are often only relatively loosely fitted into the complementary holes, such that there is some ability for the lugs to shift within the holes.

Given these limitations, such configurations involving lugs and complementary holes particularly are not well suited for some applications in which there is a need or desire for a long-lasting, high durability connection. Yet other conventional techniques for attaching a fan to a flywheel have other disadvantages. For example, one additional technique is simply to employ four screws to attach the fan to the flywheel, by screwing the screws through holes in the fan and then subsequently into complementary tapped holes in the flywheel. Although this technique results in a long-lasting, high durability connection between the fan and the flywheel, this technique is (by comparison with the aforementioned use of lugs and complementary holes) expensive and tedious to perform from a manufacturing standpoint.

For at least these reasons, therefore, it would be advantageous if a new and/or improved technique, method, and/or apparatus could be developed for attaching a fan and flywheel together in an internal combustion engine, particularly so that the fan and flywheel experienced the same rotation. It would additionally be advantageous if, for example, such a new and/or improved technique, method, and/or apparatus achieved a more long-lasting, durable attachment of the fan and flywheel to one another than has been achieved by conventional arrangements involving lugs and complementary holes, and/or allowed or facilitated the attachment of the fan and flywheel in a manner that was less expensive and/or less difficult to perform than attachment involving screws and tapped holes as discussed above.

BRIEF SUMMARY OF THE INVENTION

In at least some embodiments, the present invention relates to an apparatus for facilitating coupling of a fan and a flywheel in an internal combustion engine. The apparatus includes a plurality of protrusions formed on the fan that protrude outward from a main body of the fan, where each of the protrusions defines a respective hole therewithin, a plurality of receiving structures formed in the flywheel, and a plurality of pins. The receiving structures are positioned so that, when the fan is axially aligned with and adjacent to the flywheel, the protrusions are respectively received by the receiving structures. Further, when the pins are inserted into the holes, portions of the protrusions expand outwardly so that interference is created between exterior surfaces of the protrusions and the receiving structures, whereby due to the interference the fan and flywheel are rotationally coupled with one another.

Additionally, in at least some embodiments, the present invention relates to a method of facilitating coupling of a fan and a flywheel. The method includes positioning the fan and flywheel adjacent to one another, in a manner where the fan and the flywheel are coaxially aligned, so that a plurality of protrusions extending from a main body of the fan are received by a plurality of orifices formed within the flywheel, and inserting a plurality of pins respectively through a plurality of holes formed respectively within the plurality of protrusions until respective annular formations provided proximate respective first ends of the respective pins pass beyond respective tips of the respective protrusions, so that the pins are substantially snapped into positions relative to the protrusions. The method also includes communicating radially-outwardly directed forces applied by the pins to the protrusions toward portions of the orifices that are in contact with the protrusions, so as to establish interference forces between the protrusions and the flywheel, whereby the fan is rotationally coupled by way of the protrusions thereof to the flywheel.

Further, in at least some embodiments, the present invention relates to an internal combustion engine. The internal combustion engine includes a first structure configured for rotational movement about a crankshaft axis, the first structure including a plurality of protrusions that protrude outward from a main body of the first structure, where each of the protrusions defines a respective hole therewithin. Also, the internal combustion engine includes a second structure configured for rotational movement about the crankshaft axis, the second structure defining a plurality of orifices that are positioned so that, when the first and second structures are both aligned with respect to the crankshaft axis and adjacent to one another, the protrusions are respectively received into the orifices. Additionally, the internal combustion engine includes a plurality of pins. When the pins are inserted into the holes, portions of the protrusions expand outwardly so that interference forces are created between exterior surfaces of the protrusions and the second structure, whereby due to the interference forces the first and second structures are rotationally coupled with one another.

Many other aspects and embodiments are also contemplated and considered within the scope of the invention.

BRIEF DESCRIPTION OF THE DRAWINGS

Embodiments of the invention are disclosed with reference to the accompanying drawings. It should be understood that the embodiments shown in the drawings are provided for illustrative purposes only, and that the present invention is not limited in its application or scope to the details of construction or the arrangements of components particularly illustrated in these drawings.

DETAILED DESCRIPTION OF THE PREFERRED EMBODIMENTS

Figure 1:
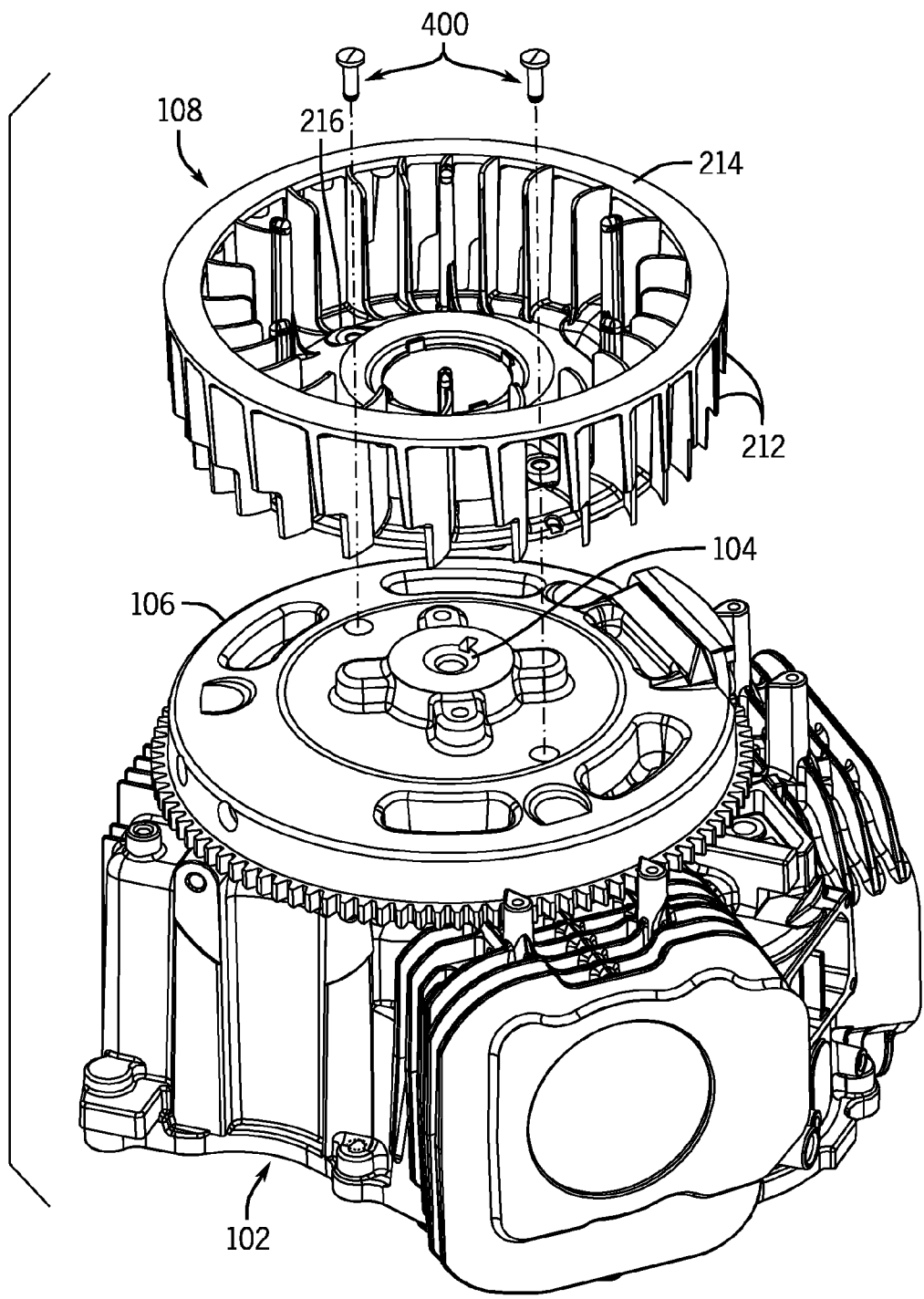
FIG. 1 is a perspective exploded view of an example internal combustion engine having a flywheel and a fan that can be attached in a particular manner in accordance with at least one embodiment of the present invention.

Referring particularly to FIG. 1, a perspective exploded view of an example internal combustion engine 102 is provided, which particularly shows the engine as having a crankshaft 104, a flywheel 106, and a fan 108. It will be understood that, when fully assembled and operational, the flywheel 106 particularly is directly rotationally coupled to the crankshaft 104 and further, as described in additional detail below, the fan 108 is attached to the flywheel so as to be rotationally coupled to the flywheel. Consequently, during operation of the engine 102, rotation of the crankshaft 104 among other things drives rotation of the flywheel 106 and fan 108. In the present embodiment, the internal combustion engine 102 is an air-cooled vertical crankshaft internal combustion engine and can be, for example, a Courage Twin engine or a Courage XT-6 engine, both of which are manufactured by Kohler Co. of Kohler, Wis. In other embodiments, the engine can take a variety of other forms in which both a flywheel and fan are present and in which it is desired that the fan and flywheel be attached to one another so as to be rotationally coupled relative to one another. For example, the engine need not be a vertical crankshaft engine but can instead be a horizontal crankshaft engine. Likewise, the size (e.g., number of cylinders) of the engine can vary depending upon the embodiment.

In the present embodiment, the internal combustion engine 102, and particularly the flywheel 106 and fan 108, are configured to include a snap-fit apparatus having several features that facilitate attachment of the fan and flywheel to one another, by way of a snap-fit method of attachment. The snap-fit apparatus and method is relatively inexpensive and simple to implement (the attachment process is simple), and allows for a long-lasting, durable connection of the fan and flywheel to be achieved. By virtue of this apparatus and method for attaching the fan and the flywheel to one another, the fan and flywheel are rigidly rotationally coupled to one another so that rotation of the one necessarily accompanies rotation of the other. Since in the present embodiment the flywheel 106 is directly coupled to the crankshaft, rotation of the crankshaft 104 necessarily not only causes rotation of the flywheel 106 but also causes accompanying rotation of the fan 108. As will be described below, several features of the snap-fit apparatus for facilitating attachment of the fan 108 and flywheel 106 particularly are directed towards achieving rotational, rather than axial, coupling of the fan and flywheel. That is, the present embodiment includes first features that achieve rotational coupling/locking of the fan and flywheel and other features that achieve axial coupling/locking of the fan and flywheel (not shown), although in other embodiments it is possible that the features employed to achieve rotational coupling/locking can also be used to achieve axial coupling/locking.

Figure 2:
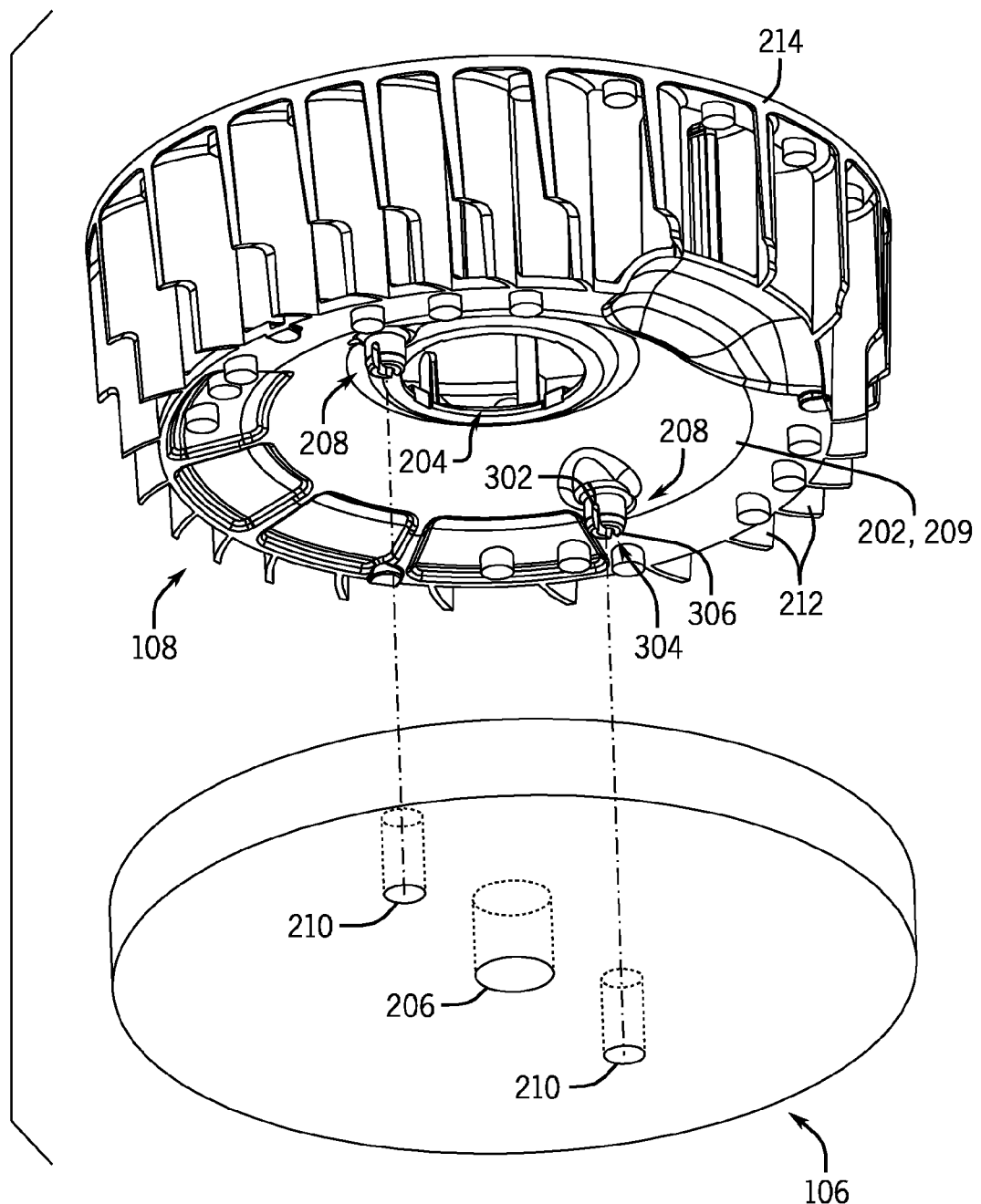
FIG. 2 is a further perspective view of the flywheel (shown in a simplified form) and fan of FIG. 1 exploded from one another.

Additionally referring to FIG. 2, a further perspective view of the fan 108 and flywheel 106 exploded from one another is provided. The particular perspective view provided in FIG. 2 is a bottom side perspective view, as opposed to the perspective view of FIG. 1, which is a top side perspective view, so as to highlight particular features along the underside of the fan 108. Although the fan 108 is shown with the same level of detail as shown in FIG. 1, the flywheel 106 is shown in a simplified form. As shown in FIG. 2, the fan 108 includes a main body or annular wall 202 having an underside surface 209 that is particularly the portion of the fan that is intended to be mounted against (or to face) the flywheel 106 when the fan and flywheel are assembled together. An upper (interior) surface 216 of the annular wall 202 is visible in FIG. 1. Further as shown, the fan 108 (and particularly the annular wall 202 thereof) has a central orifice 204 and similarly the flywheel 106 has a central orifice 206, by which both the fan and the flywheel respectively are coaxially mounted onto the crankshaft 104 (see FIG. 1), with the fan being particularly mounted atop the flywheel. It should be appreciated that, in the present embodiment, the flywheel 106 is additionally configured in a manner by which the flywheel can be attached to, and rotationally and axially locked in place relative to, the crankshaft 104. For example, in one embodiment, the flywheel has a slot feature intended to receive a complementary key feature of the crankshaft. By contrast, and notwithstanding the central orifice 204, the fan 108 is not directly attached to the crankshaft 104 so as to be rotationally and axially locked in place relative to the crankshaft. Rather, the fan 108 is merely attached to the flywheel 106, and it is by virtue of this attachment that the fan is indirectly rotationally and axially locked in place relative to the crankshaft 104.

It can be further appreciated from FIG. 2 that, in the present embodiment, the fan 108 has multiple fins or fan blades 212 that extend radially outward and also axially upward, away from the annular wall 202 so as to extend away from the flywheel 106 when the fan is attached to the flywheel. In the present example embodiment, the annular wall 202 of the fan 108 has an outer circumference that is significantly less than the outer circumference of the fan as defined by outer (radially outermost) edges of the fan blades 212. The annular wall 202 is generally flat, although in the present example embodiment it does also have some concavity upward as one proceeds radially inward toward the central orifice 204. Additionally, in the present embodiment, an upper annular rim 214 is also provided on the fan 108 extending across top edges of all of the fan blades 212 of the fan. As shown in FIG. 2 (also see FIG. 1), the upper annular rim 214 has an outer circumference that coincides with the outer edges of the fan blades, has an inner diameter that is significantly less than the outer diameter established by the outer edges of the fan blades but not as small as an inner diameter associated with inner (radially innermost) edges of the fan blades, and is flat along its upper surface. In the present embodiment, the fan 108 is manufactured from molded plastic albeit, in other embodiments, it can be formed from other materials. By contrast, the flywheel 106 can be made of metal or other materials such that the flywheel can develop sufficient weight and angular momentum to provide desired functional benefits. Although the fan 108 and flywheel 106 can have the particular features discussed above, in other embodiments other fans and flywheels can be employed that have a variety of other structural characteristics.

Figure 3:
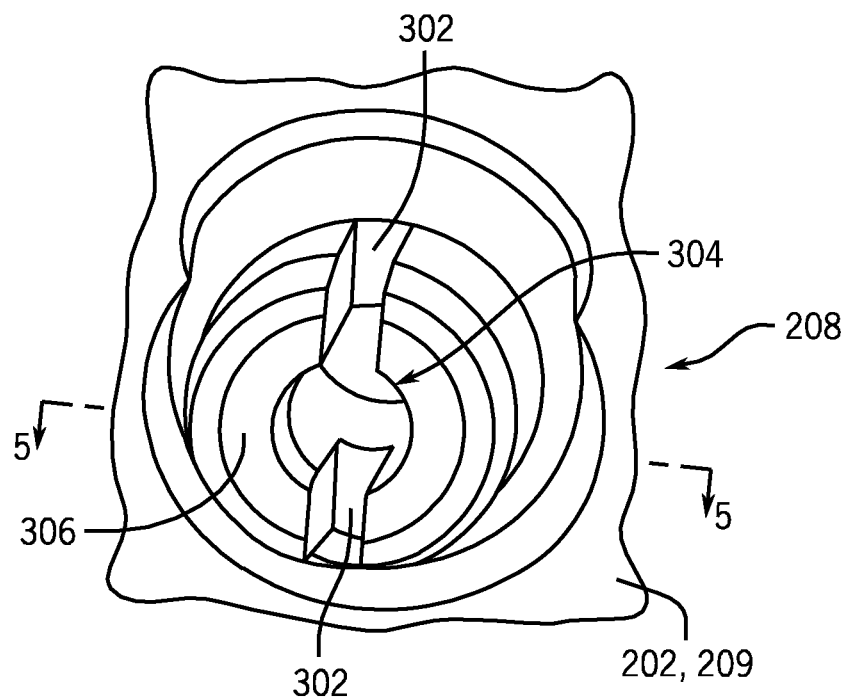
FIG. 3 is a perspective cutaway view showing in more detail an example lug (or protrusion) formed on the fan of FIGS. 1 and 2.

Now referring both to FIG. 2 and additionally FIG. 3, the features of the flywheel 106 and fan 108 allowing for their attachment in the present embodiment particularly include two lugs or protrusions (hereinafter referred to simply as lugs) 208, one of which is shown in further detail in a perspective cutaway view of FIG. 3. As shown, in the present embodiment, each of the lugs 208 extends outward (in this example, downward) from the underside surface 209 of the annular wall 202 of the fan 108. The lugs 208 are particularly configured to fit into two complementary holes or orifices 210 of the flywheel 106, which are shown in phantom in FIG. 2, and which are on diametrically opposite sides of the central orifice 206 of the flywheel by which the flywheel is coaxially mounted onto the crankshaft 104. The complementary holes 210, or the surfaces of the flywheel 106 defining the complementary holes, are receiving structures configured for receiving the lugs 208, and can be substantially cylindrical in shape or even exactly complementary in shape to the lugs. Further as shown, the lugs 208 are specially designed to have horizontal splits 302 and tapered internal holes 304 (the tapering of which is more clearly evident from FIG. 5, as discussed further below). In the present embodiment, the horizontal splits 302 of each of the lugs 208 particularly only extend a portion (e.g., about three-quarters) of the distance between a respective tip 306 of each respective lug and the underside surface 209 of the annular wall 202 of the fan 108 from which the lug extends. That is, as shown, the horizontal splits 302 of each of the lugs 208 particularly extend from the respective tip 306 of the respective lug toward the annular wall 202, but not all of the way to that annular wall.

Figure 4:
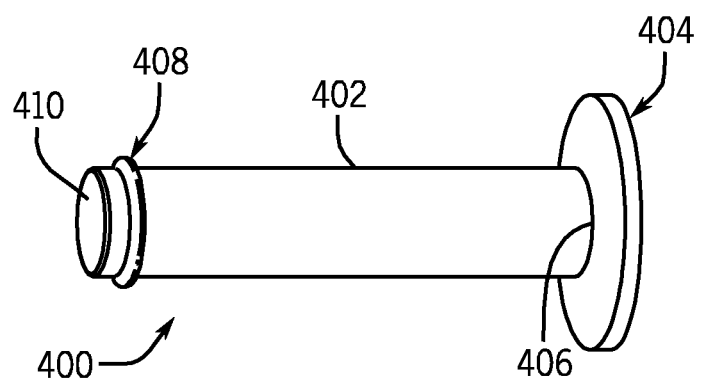
FIG. 4 is a perspective view of an example pin that can be employed in relation to the lug for the purpose of facilitating attachment of the fan and flywheel of FIGS. 1 and 2 together.

In addition to the lugs 208 and the complementary holes 210, in the present embodiment attachment of the flywheel 106 and fan 108 is achieved by way of two pins 400 that are respectively configured to fit within respective ones of the tapered internal holes 304 of respective ones of the lugs 208 when the lugs are further positioned, respectively, into respective ones of the complementary holes 210 of the flywheel. A perspective view of one of the pins 400 is shown in FIG. 4 (additionally, across-sectional view of one of the pins 400, taken along the central axis of that pin, is further shown in FIG. 5 as discussed further below). As should be evident from FIG. 4, each of the pins 400 more particularly has a constant-diameter stem 402, a head 404 at a first end 406 of the stem, and also an annular (ring) protrusion 408 proximate to, but positioned somewhat inwardly of (toward the middle of the stem 402), an opposite end 410 of the stem. Although the stem 402 has a constant diameter along its length, the stem can be slightly inwardly tapered at the opposite end 410 (that is, on the side of the annular protrusion 408 other than the side facing the head 404) as shown. In the present embodiment, each of the pins 400 can be made from plastic (e.g., Nylon 6 plastic), but in other embodiments the pins can be made from any of a variety of other materials.

Figure 5:
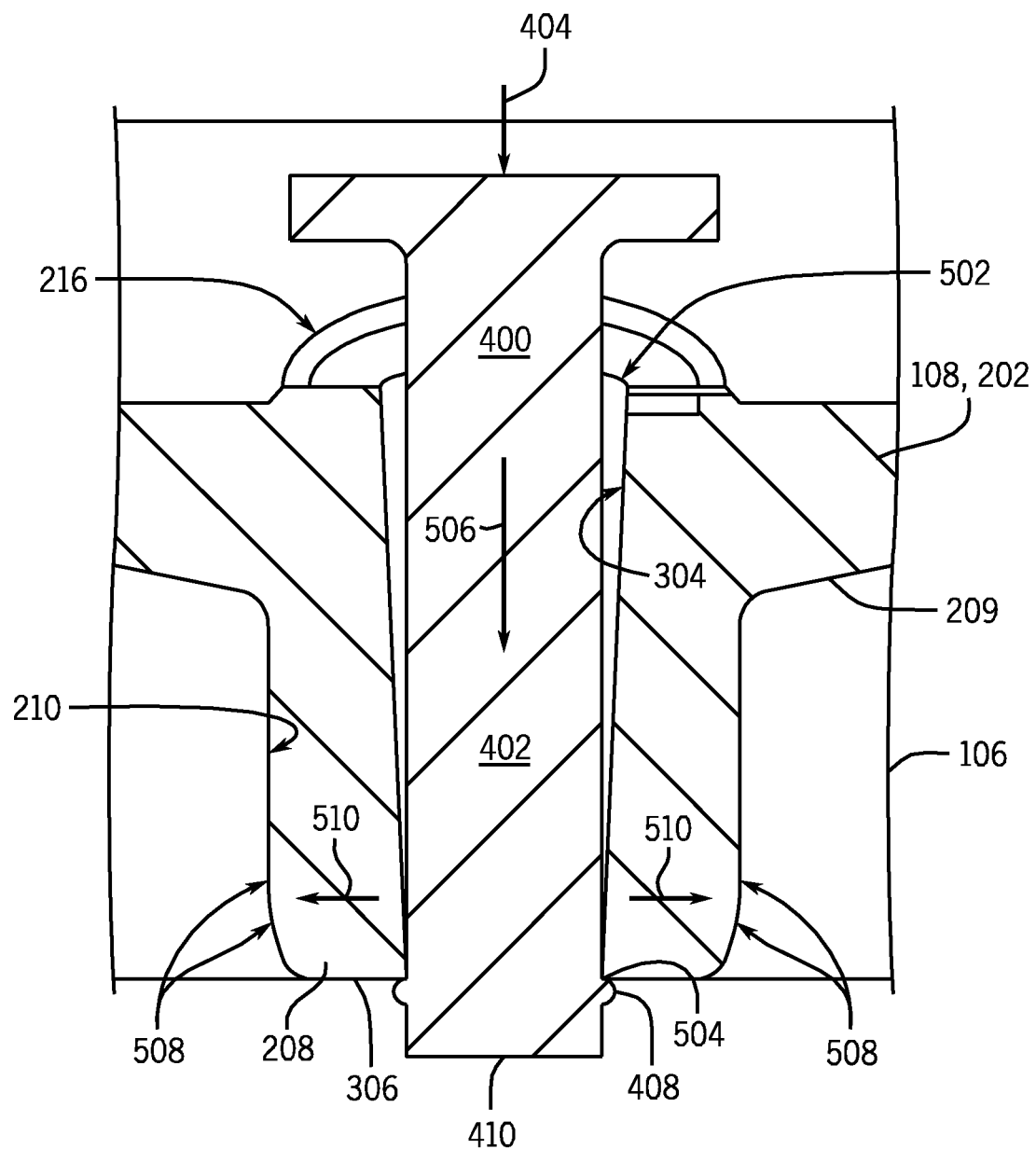
FIG. 5 is a cross-sectional cutaway view of the fan and flywheel of FIGS. 1 and 2 attached to one another by way of the pin of FIG. 4.

Now referring to FIG. 5, across-sectional cutaway view is provided showing one of the pins 400 inserted within one of the lugs 208 of the fan 108, with the lug in turn being positioned within one of the complementary holes 210 of the flywheel. The cross-sectional view can particularly be considered as corresponding to a cross-section taken through the central axis of the lug 208, along a line 5-5 as shown in FIG. 3, except insofar as FIG. 5 also shows the lug assembled in combination with one of the pins 400 and also the flywheel 106 (which are not shown in FIG. 3). A portion of the upper surface 216 of the annular wall 202 is also shown in FIG. 5 because, in the present embodiment as already noted, the annular wall exhibits some concavity such that the upper surface 216 thereof has a slightly convex shape (so as to extend increasingly upward, away from the flywheel 106, as one proceeds radially inward toward the central orifice 204).

The arrangement illustrated in FIG. 5 is particularly representative of the assembly of the fan 108, flywheel 106, and pins 400 when the fan 108 and flywheel 106 are fully assembled and attached to one another, as is the case when the fan and flywheel are positioned onto (and the flywheel particularly is attached to) the crankshaft 104. It should be appreciated that, although the view of FIG. 5 particularly shows one of the pins 400, one of the lugs 208, and one of the complementary holes 210, full assembly of the fan 108 and flywheel 106 in the present embodiment involves both of the lugs 208 shown in FIG. 2 being positioned within both of the complementary holes 210, with each one of the lugs being positioned in a respective one of the complementary holes, and further involves two of the pins 400 being positioned within two of the tapered internal holes 304 of the lugs, with each one of the pins being positioned in a respective one of the tapered internal holes.

FIG. 5 further illustrates how, in the present embodiment the configurations of the lugs 208, complementary holes 210, pins 400, and tapered internal holes 304 are particularly suited to facilitate attachment of the fan 108 and flywheel 106. The present method of establishing rotational coupling between the fan 108 and the flywheel 106 begins with the fan and flywheel being put into contact with one another such that the lugs 208 are within the complementary holes 210. Thus, FIG. 5 shows one of the lugs 208 to be positioned within one of the complementary holes 210. Once the lugs 208 are positioned within the complementary holes 210, the pins 400 (including the pin shown in FIG. 5) can be inserted into the tapered internal holes 304 as illustrated in FIG. 5. The particular shapes and sizes of the pins 210, tapered internal holes 304, lugs 208, and complementary holes 210 are such that insertion of the pins into the tapered internal holes 304 results in the pins eventually achieving a "snap fit" relative to the lugs 208, which in turn results in interference (or interference forces) between the lugs and the complementary holes 210.

More particularly in this regard, as already discussed, the stem 402 of the pin 400 shown in FIG. 5 has a constant diameter, and particularly has a constant diameter between the head 404 and the annular protrusion 408. By contrast, the tapered internal hole 304 as shown is tapered such that the diameter of the tapered internal hole becomes smaller as one proceeds from an upper end 502 of the tapered internal hole to a lower end 504 of the tapered internal hole. Due to the horizontal splits 302 of the lug 208, the lug can expand radially outward as indicated by arrows 510 if appropriate radially-outward pressure is experienced along the internal surface of the lug forming the tapered internal hole 304, for example, radially-outward pressure as can occur when the pin 400 is inserted into the tapered internal hole as discussed further below. In the absence of such radially-outward pressure (e.g., because the pin 400 is not yet inserted into the tapered internal hole 304), the lug 208 can be considered in its rest state. When in this rest state, a minimum diameter of the tapered internal hole at or proximate the lower end 504 is slightly smaller than the outer diameter of the constant diameter stem 402 of the pin 400, and also is smaller than the diameter of the annular protrusion 408 of the pin 400.

Proper insertion of one of the pins 400 into one of the tapered internal holes 304 such as shown in FIG. 5 occurs by inserting the opposite end 410 of the pin into the upper end 502 of the tapered internal hole, and pressing the pin downward in the direction of an arrow 506 through the tapered hole until the annular protrusion 408 proceeds out of the lower end 504, of that tapered internal hole, which is at the tip 306 of the lug 208, and snaps into place beneath the tip of the lug. Due to shapes and sizes of the tapered internal hole 304 and the pin 400, including the constant-diameter of the stem 402 and the annular protrusion 408, the insertion of one of the pins 400 through the tapered internal hole 304 of a corresponding one of the lugs 208 such as that shown in FIG. 5 necessarily creates radially-outwardly-directed pressure upon the inner surface of the tapered internal hole 304, particularly as one approaches the tip 306 where the diameter of the tapered internal hole is smallest during its rest state. The application of this pressure tends to force the lug 208 to expand radially outward in the directions indicated by the arrows 510, something which is facilitated and accommodated by the horizontal splits 302 of the respective lug 208 (as shown in FIGS. 2 and 3).

More particularly, the horizontal splits 302 allow the lug 208 to expand slightly radially outwardly, as indicated by the arrows 510, as the stem 402 and annular protrusion 408 of the pin 400 pass through the tapered internal hole 304 and ultimately the opposite end 410 and annular protrusion 408 proceed out of the lower end 504 of the tapered internal hole. Once this has occurred, the pin 400 is locked in place relative to the lug 208. Further, due to the particular shapes and sizes of the tapered internal hole 304 and pin 400 (and particularly because the outer diameter of the stem 402 exceeds the minimum diameter of the tapered internal hole 304), even after the pin 400 has been fully inserted so that the annular protrusion 408 has proceeded past the lower end 504 of the tapered internal hole 304, the lug 208 continues to be slightly radially outwardly expanded (again as indicated by the arrows 510) as accommodated by the horizontal splits 302. As a result of this continued expansion of the lug 208, interference occurs at a region 508 proximate the tip 306 of the lug between the lug and the complementary hole 210 within which it is positioned, so as create a tight fit between the lug and complementary hole 210. With both of the lugs 208 of the fan 108 and complementary holes 210 of the flywheel 106 engaged in this manner, there is established a strong connection between the flywheel and fan that achieves the desired level of rotational coupling/locking between the two structures.

It should be appreciated that such rotational coupling/locking typically can last indefinitely and can be achieved simply by positioning the lugs 208 within the complementary holes 210 and additionally axially positioning the pins 400 into the tapered internal holes 304, without any need for more complicated or labor-intensive fastening steps such as screwing. Once inserted, the pins 400 naturally stay in place within the tapered internal holes 304 and the interference between the lugs 208 and complementary holes 210 remains unless and until sufficient force is applied to remove the pins. That said, due to the particular configuration of the lugs 208, tapered internal holes 304, complementary holes 210, and pins 400, it should be appreciated that decoupling and disassembly of the fan 108 and flywheel 106 from one another can also still be accomplished in an easy and straightforward manner. That is, decoupling of the fan 108 and flywheel 106 can be achieved by applying appropriate force to each of the pins 400, in directions opposite that illustrated by the arrow 506 of FIG. 5, so that the annular protrusions 408 can overcome the force of the lugs 208 tending to prevent reentry of the annular protrusions through the lower ends 504 into the tapered internal holes 304, and then continuing to apply such force until the pins are fully removed from the tapered internal holes. Once removal of the pins 400 has been achieved, then the fan 108 and flywheel 106 can be pulled apart from one another such that the lugs 208 are removed from the complementary holes 210.

Notwithstanding the above description, numerous other embodiments and applications are intended to be encompassed herein. For example, although in the present embodiment there are two of each of the lugs 208, the tapered internal holes 304, the complementary holes 210, and the pins 400, in other embodiments there can be more or less than two of each of these (e.g., three lugs, three tapered internal holes, three complementary holes, and three pins). Also for example, although in the present embodiment each of the lugs 208 has two of the horizontal splits 302, so that that each lug has two substantially-semicircular protruding sections extending about its tapered internal hole, in other embodiments there can be less than two or more than two such splits that accommodate radially-outward expansion of the lug, and correspondingly there can be different numbers of protruding sections of the lug. Also, although in the present embodiment the tapering of the tapered internal holes 304 is such that the diameter of each of the tapered internal holes proceeds to decrease between the upper end 502 and the lower end 504 and such that the diameter attains its minimum proximate the lower end 504, in other embodiments it is possible that the minimum diameter would occur somewhere in between the two ends of the hole.

Further, although in the present embodiment the lugs are formed on the fan 108 and the complementary holes 210 are formed on the flywheel 106, it is possible in alternate embodiments that such lugs would be formed on the flywheel and that the complementary holes would be formed on the fan. That said, typically it is desirable for the lugs to be formed on a structure made of a material that is moldable and that has some flexing capability, so as to allow expansion of the lugs during insertion of the pins (and thus, in the present embodiment, where it is the fan but not the flywheel that is made of plastic, the lugs are formed on the fan). Also, although in the present embodiment it is particularly the annular protrusions 408 of the pins 400 that serve to allow the pins to be snapped into place relative to the lugs 208, in other embodiments other features can be provided on the pins (and/or on the lugs 208) that also permit such snap-fit interaction to be achieved including, for example, radially-outwardly-extending bumps or protrusions on the pins 400.

It should also be appreciated that, although the description of the above embodiment includes the use of terms such as "lower," "upper," "underside," "upward," "downward", and the like suggesting directional orientations or orientations relative to the ground or some other reference point are merely being used to facilitate description of the above embodiment, but not to limit the scope of the embodiments encompassed herein. Rather, the present disclosure is intended to encompass numerous embodiments in addition those specifically discussed above and/or show in FIGS. 1-5, including for example (as mentioned earlier) embodiments pertaining to horizontal crankshaft engines.

Additionally for example, although the above description concerns fastening of a fan to a flywheel in an internal combustion engine, the same or substantially the same apparatus and method as described above can be utilized to achieve rotational coupling of another structure relative to a flywheel, to achieve rotational coupling of another structure relative to a fan, or to achieve rotational coupling of two other structures relative to one another (e.g., two other structures intended to rotate about a common axis for which rotational coupling is desired). Indeed, the present disclosure is additionally generally intended to encompass embodiments in which a first structure is attached to a second structure (regardless of whether either of the first and second structures is a fan, flywheel, and/or another structure or structures), even where such structures are not necessarily implemented on or in conjunction with an internal combustion engine. For example, embodiments of the present disclosure can be implemented in relation to generators, turbines (e.g., wind turbine mechanisms), and a variety of other machines or mechanisms, particularly machines or mechanisms having operation that involves rotational motion, in a variety of contexts. Among other things, the above-described snap-fit method of engagement, and related arrangements encompassed herein, can be helpful for establishing any joint that is to be installed as a slip-fit, subject to tolerances, and requires a tight-fitting result.

It is specifically intended that the present invention not be limited to the embodiments and illustrations contained herein, but include modified forms of those embodiments including portions of the embodiments and combinations of elements of different embodiments as come within the scope of the following claims.

I claim:

1. In an internal combustion engine, an apparatus for facilitating coupling of a fan and a flywheel, the apparatus comprising:
  a plurality of protrusions formed on the fan that protrude outward from a first side surface of a main body of the fan, wherein each of the protrusions defines a respective hole therewithin and the respective hole extends all of a respective distance from a respective tip of the respective protrusion protruding outward from the first side surface, through the respective protrusion and the main body, to a second side surface of the main body of the fan that is opposed to the first side surface;
  a plurality of receiving structures formed in the flywheel, wherein the receiving structures are positioned so that, when the fan is axially aligned with and adjacent to the flywheel, the protrusions are respectively received by the receiving structures; and
  a plurality of pins,
  wherein when the pins are inserted into the holes, portions of the protrusions expand outwardly so that interference is created between exterior surfaces of the protrusions and the receiving structures,
  wherein each of the pins includes a respective stem and a respective formation proximate a respective first end of the respective stem,
  wherein the pins and protrusions are configured so that, when a respective one of the pins is fully inserted into a respective one of the holes associated with a respective one of the protrusions, the respective formation of the one pin is located beyond the respective tip of the respective protrusion,
  whereby the one pin is substantially locked in place relative to the one protrusion, and
  whereby due to the interference the fan and flywheel are rotationally coupled with one another.

2. The apparatus of claim 1, wherein each respective hole is tapered so as to become increasingly smaller as one proceeds from a respective first end of the respective hole toward a respective second end of the respective hole.

3. The apparatus of claim 2, wherein a minimum diameter of each respective hole is located at or proximate to the second end of the respective hole.

4. The apparatus of claim 2, wherein the respective stem of each of the pins has a respective outer diameter that, at least at a first location along a length of the respective stem, exceeds a minimum rest state diameter of the respective hole into which the respective pin is to be inserted.

5. The apparatus of claim 1, wherein, when the respective one of the pins is inserted into the respective one of the holes associated with the respective one of the protrusions, the one protrusion experiences radially outward expansion.

6. The apparatus of claim 5, wherein each of the protrusions includes at least one gap separating portions of the respective protrusion, the at least one gap being configured to accommodate radially outward expansion.

7. The apparatus of claim 1, wherein one or more of pins and the protrusions are made of a plastic material.

8. The apparatus of claim 1, wherein the protrusions are integrally formed as parts of the fan.

9. A system comprising the apparatus of claim 1, and further comprising the fan and the flywheel.

10. The system of claim 9, wherein either the apparatus or an additional apparatus serves to axially couple the fan and flywheel in relation to one another.

11. An internal combustion engine comprising;
  a first structure configured for rotational movement about a crankshaft axis, the first structure including a plurality of protrusions that protrude outward from a first side surface of a main body of the first structure, wherein each of the protrusions defines a respective hole there within that extends all of a respective distance from a respective tip of the respective protrusion protruding outward from the first side surface, through the respective protrusion and the main body, to a second side surface of the main body of the first structure that is opposed to the first side surface;
  a second structure configured for rotational movement about the crankshaft axis, the second structure defining a plurality of orifices that are positioned so that, when the first and second structures are both aligned with respect to the crankshaft axis and adjacent to one another, the protrusions are respectively received into the orifices; and
  a plurality of pins,
  wherein when the pins are inserted into the holes, portions of the protrusions expand outwardly so that interference forces are created between exterior surfaces of the protrusions and the second structure,
  wherein each of the pins includes a respective stem and a respective formation proximate a respective first end of the respective stem,
  wherein the pins and protrusions are configured so that, when a respective one of the pins is fully inserted into a respective one of the holes associated with a respective one of the protrusions, the respective formation of the one pin is located beyond the respective tip of the respective protrusion, and
  wherein a first of the first and second structures is a fan and a second of the first and second structures is a flywheel,
  whereby the one pin is substantially locked in place relative to the one protrusion, and
  whereby due to the interference forces the first and second structures are rotationally coupled with one another.

12. The internal combustion engine of claim 11, further comprising means for snap-fitting the pins in positions relative to the holes, whereby the pins are substantially locked in place relative to the holes.

13. The apparatus of claim 1, wherein each of the pins also includes a respective head at a second end of the respective stem opposite the respective first end of the respective stem, wherein a diameter of the respective head of the one pin is larger than a diameter of the one hole into which the one pin is fully inserted such that, when the one pin is fully inserted into the one hole, the respective head of the one pin is positioned beyond the second side surface outside of the main body.

14. The apparatus of claim 1, wherein the respective formation comprises an annular formation.

15. The internal combustion engine of claim 11, wherein the first structure is the fan and the second structure is a flywheel.

16. The internal combustion engine of claim 15 wherein, when the respective one of the pins is inserted into the respective one of the holes associated with the respective one of the protrusions, the one protrusion experiences radially outward expansion.

17. The internal combustion engine of claim 16, wherein each of the protrusions includes at least one gap separating portions of the respective protrusion, the at least one gap being configured to accommodate radially outward expansion.

18. The internal combustion engine of claim 17, wherein one or more of the pins and the protrusions are made of a plastic material.

19. The internal combustion engine of claim 18, wherein the protrusions are integrally formed as parts of the fan.

* * * * *